United States Patent [19]

Kitao et al.

[11] Patent Number: 5,316,621
[45] Date of Patent: May 31, 1994

[54] METHOD OF PULPING WASTE PRESSURE-SENSITIVE ADHESIVE PAPER

[75] Inventors: Osamu Kitao; Masaru Tsuji; Masatoshi Okuda; Shunichi Uchimura; Jun-ichirou Tanaka, all of Amagasaki, Japan

[73] Assignee: Kanzaki Paper Mfg. Co., Ltd., Tokyo, Japan

[21] Appl. No.: 862,539

[22] PCT Filed: Oct. 7, 1991

[86] PCT No.: PCT/JP91/01366
§ 371 Date: Jun. 18, 1992
§ 102(e) Date: Jun. 18, 1992

[87] PCT Pub. No.: WO92/07137
PCT Pub. Date: Apr. 30, 1992

[30] Foreign Application Priority Data

Oct. 19, 1990 [JP] Japan ................................ 2-283024
Oct. 29, 1990 [JP] Japan ................................ 2-293260
Oct. 31, 1990 [JP] Japan ................................ 2-296457
Dec. 12, 1990 [JP] Japan ................................ 2-401636

[51] Int. Cl.$^5$ .............................................. D21B 1/08
[52] U.S. Cl. ............................................. 162/4; 162/5; 162/6; 162/8; 162/55; 162/56
[58] Field of Search ........................ 162/4, 5, 6, 8, 55, 162/56, 60, 87, 88, 72

[56] References Cited

U.S. PATENT DOCUMENTS

| 4,168,199 | 9/1979 | Mamers et al. | 162/4 |
| 4,219,381 | 8/1980 | Schnell | 162/4 |
| 4,909,900 | 3/1990 | Matzke et al. | 162/4 |
| 5,131,980 | 7/1992 | Chamblee et al. | 162/4 |

FOREIGN PATENT DOCUMENTS

| 3-199479 | 8/1981 | Japan | 162/6 |
| 2112830 | 7/1983 | United Kingdom | 162/6 |

Primary Examiner—Peter Chin
Attorney, Agent, or Firm—Flynn, Thiel, Boutell & Tanis

[57] ABSTRACT

A method of obtaining an excellent recycled pulp from waste pressure-sensitive adhesive paper which has previously been discarded. This method being characterized in that the waste paper is defiberized, then a defiberized suspension thereof is diluted, the diluted suspension is coarse screened by a screen having a slit width of below 0.5 mm, the pulp suspension after coarse screening is dewatered so as to have a solid matter consistency of 15 to 40% by weight, the dewatered stuff is mechanically agitated, the difference between the temperature of the stuff before the agitation and the temperature thereof after the agitation being below 12° C., the obtained stuff is being diluted again, the diluted suspension is fine screened by a screen having a slit width of below 0.2 mm, the obtained accept is mixed with a surface active agent and subjected to flotation separation, the accept is cleaned by a cleaner for heavy foreign matters and/or a cleaner for light foreign matters, and then the accept being washed.

20 Claims, 1 Drawing Sheet

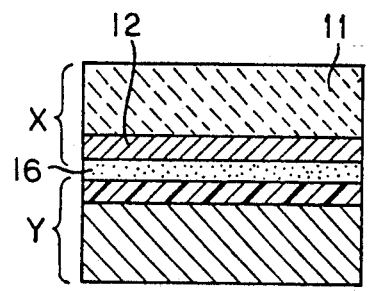
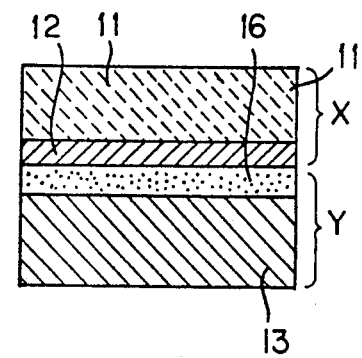
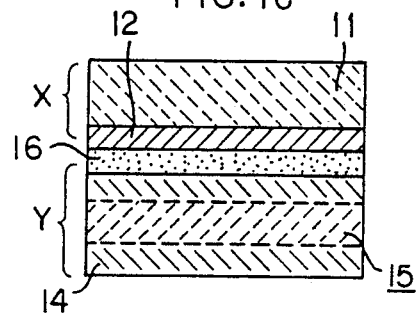
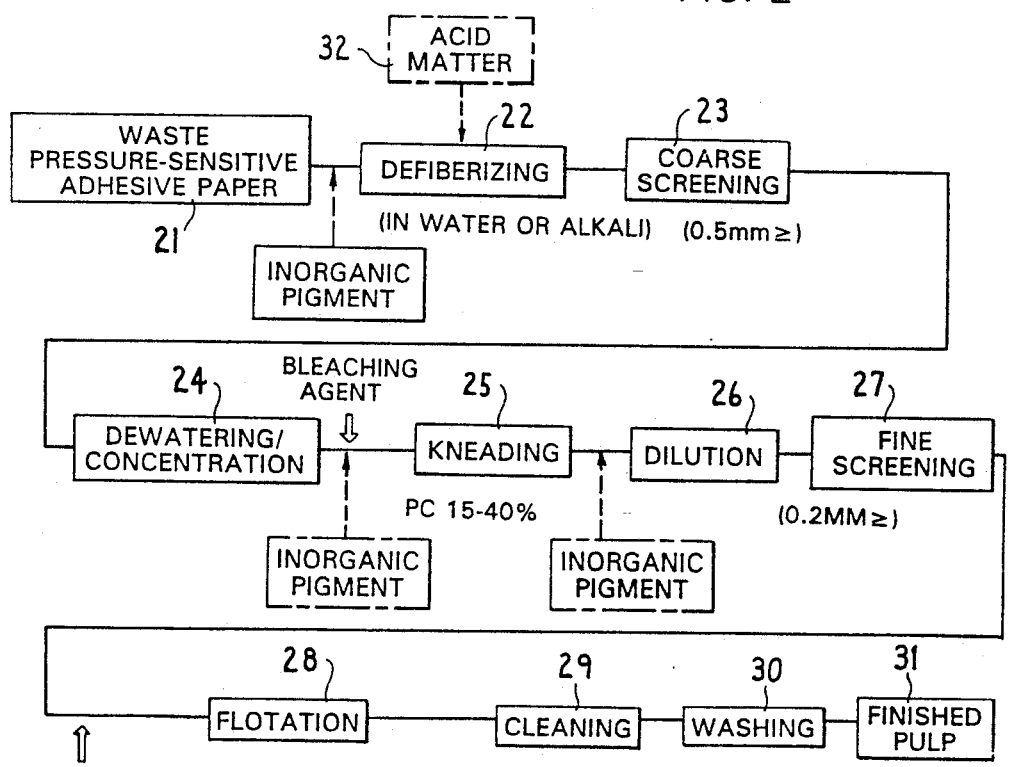

METHOD OF PULPING WASTE PRESSURE-SENSITIVE ADHESIVE PAPER

TECHNICAL FIELD

The present invention relates to a method of pulping waste paper, particularly a method of obtaining a recycled pulp from waste pressure-sensitive adhesive paper (including broke) which has been discarded so far. More particularly, the invention relates to a method of efficiently separating pressure-sensitive adhesive, silicone, plastic films, etc. from said waste pressure-sensitive adhesive paper and obtaining a recycled pulp having a high brightness.

BACKGROUND ART

In Japan at present, the amount of waste paper, including broke for regeneration, used as a material for producing paper and paper board exceeds 50% of the total production materials and already occupies the position of a main material.

Waste papers which can be pulped again include newspaper corrugated containers, magazines, printed woodfree, color printed wood free paper (including art paper), white shavings, cards, high grade white wood containing shavings, white wood containing shavings, white manila, tickets, high grade wood containing waste, brown printed woodfree, chipboard cuttings, carton box waste, thermosensitive paper, pressure-sensitive duplicating paper and CPO (computer printout).

These waste papers are generally pulped again through a defiberizing process in which the waste Papers are defiberized and a pulp suspension is obtained, a coarse screening process in which foreign matters are separated from the pulp suspension, a fine screening process, a deinking process in which printing ink is removed, a bleaching process for whitening, etc. However, waxed paper, pressure-sensitive adhesive paper, paper coated with a hot-melt agent, etc. are discarded or burned at present as "taboos", or waste papers which can never be pulped again, because it is impossible to remove wax, pressure-sensitive adhesive, hot-melt agent, etc. from the pulp fibers.

According to the quality standard of waste papers established by the industry, it is basically improper to mix paper stuff with said waxed paper, pressure-sensitive adhesive paper or paper coated with a hot-melt agent, and they may be mixed only in an unavoidable case in an amount less than 0.3%.

The reason therefor is explained in case of the Pressure-sensitive adhesive paper as follows: The pressure-sensitive adhesive paper contains a pressure-sensitive adhesive as much as 5 to 50%, and it is impossible to remove said pressure-sensitive adhesive from pulp fibers because the adhesive has a large adhesive strength. If a recycled pulp containing the pressure-sensitive adhesive is made into paper, the pressure-sensitive adhesive may clog wires and contaminate a press roll or a felt in a paper-making process, causing problems such as a breakdown and the reduction of paper-making efficiency. Furthermore, there is a fatal problem that the pressure-sensitive adhesive exerts a bad influence upon the forming of a paper layer or the paper quality. For example, the pressure-sensitive adhesive forms spots on the paper surface. Under these circumstances, a method of pulping waste pressure-sensitive adhesive paper has not been tried yet and there has been no literature disclosing said pulping method.

The present invention provides a novel method of obtaining a recycled pulp from waste pressure-sensitive adhesive paper. More particularly, it is an object of the invention to provide a pulping method for effectively separating foreign matters such as pressure-sensitive adhesive, silicone and plastic films and obtaining a recycled pulp having a high brightness even when colored waste paper is included, said recycled pulp being free from operation troubles in the paper-making process and wild formation.

Disclosure of Invention

The present invention provides a method of pulping waste Pressure-sensitive adhesive paper characterized in that ① said waste paper is defiberized, ② then a defiberized suspension thereof is diluted, ③ the diluted suspension is coarse screened by means of a screen having a slit width of below 0.5 mm, ④ the pulp suspension after coarse screening (accept) dewatered so as to have a solid matter consistency of 15 to 40% by weight, ⑤ the concentrated stuff mechanically agitated under the condition that the temperature difference of the stuff in the mechanical agitation (=before and after kneading) is below 12° C., the stuff obtained diluted again, ⑦ the diluted solution fine screened by means of a screen having a slit width of below 0.2 mm, the accept obtained mixed with a surface active agent and subjected to foam flotation separation (flotation process) by being agitated while air is introduced thereinto, ⑨ the accept cleaned by means of a cleaner for heavy foreign matters and/or a cleaner for light foreign matters, 10 and the accept washed. Said waste pressure-sensitive adhesive paper includes waste release liner.

BRIEF DESCRIPTION OF DRAWINGS

FIGS. 1(a)–(c) show typical pressure sensitive adhesive paper handles by the present invention.

FIG. 2 shows the invention process of the present invention.

DETAILED DESCRIPTION OF THE INVENTION

The pressure-sensitive adhesive paper handled in the present invention is commercially made into labels, sheets, seals, etc. used in various ways for commercial use, business use, domestic use, etc. The pressure-sensitive adhesive paper generally comprises, as shown in FIG. 1 (a) to (c), a pressure-sensitive adhesive sandwiched between a face stock X and a release liner Y. The face stock is mainly a paper 11 which may be kraft paper, high grade wood containing paper, wood free paper, coated paper, art paper, cast coated paper, pressure-sensitive duplicating paper, thermosensitive paper, PPC (plain paper copier) or any of these papers laminated with plastic. In some products, the face stock comprises a plastic film, aluminium foil or the like in place of said papers. Said face stock 11 is coated on its reverse side with a pressure-sensitive adhesive 12. The pressure-sensitive adhesive may be of a rubber, acrylic or vinyl ester emulsion type, a solvent type or a solventless type.

The paper forming the release liner Y may be a laminated paper comprising kraft paper, wood free paper, coated paper, art paper, cast coated paper, etc. laminated with a plastic film as shown in FIG. 1 (a), or a high-density paper such as glassine paper as shown in FIG. 1 (b). Quantitatively these occupy a major portion of the pressure-sensitive adhesive paper.

Also, the release liner Y may be a pigment coated paper 15 having pigment coating layers 14 on two sides thereof. The release liner Y is coated with a release agent 16 such as a silicone compound and a fluorine compound, said release agent being in adhesion with said pressure-sensitive adhesive 12 of the face stock X. The release liner may comprise a plastic film, etc., other than said papers, directly coated with a release agent such as a silicone compound and a fluorine compound.

The waste pressure-sensitive adhesive paper handled in the Present invention means the above-mentioned products which have already been used for their intended purposes. Generally speaking. It is very difficult in view of the actual state of waste paper collection to collect waste pressure-sensitive adhesive paper separately from other waste paper although this depends upon the behavior of the users. Therefore, for the time being, the present invention does not intend to handle waste pressure-sensitive adhesive paper which has already been used. If it becomes possible in future to collect waste pressure-sensitive adhesive paper separately from other waste paper, it is a matter of course that the used waste pressure-sensitive adhesive paper can be handled in the present invention.

In practice, waste pressure-sensitive adhesive paper appears in relatively large quantities in the production process of the pressure-sensitive adhesive paper. As is generally known, in the production process of the pressure-sensitive adhesive paper, a wide face stock or a wide release liner is supplied in a rolled state, a release agent such as a silicone resin and a pressure-sensitive adhesive applied thereto, then said materials are adhered to each other. However, it is very difficult to adhere said face stock and release liner together precisely in the direction of the width. If they are not in alignment with each other, the commercial value of the product is seriously reduced. Therefore, it is necessary to cut off both edges of the paper by means of a slitter immediately after the adhesion process. Such edges cut off, defective products, the last portion of the roll, etc. are usually called "broke" and appear in considerably large quantities. However, these were discarded as mentioned above.

The present invention makes it possible to obtain a recycled pulp by using broke appearing in said production process of the pressure-sensitive adhesive paper as a waste paper stock (Needless to say, this includes a collected waste paper stock mainly comprising used pressure-sensitive adhesive paper.) on the present industrial scale.

The pulping method of the present invention will now be described in detail below. As shown in the flow sheet of FIG. 2, according to the present invention, the above-mentioned waste pressure-sensitive adhesive paper 21 is defiberized by means of a pulper, etc. in a defiberizing process 22 to obtain a suspension. In the defiberizing process, foreign matters such as pressure-sensitive adhesives and plastic films contained in said waste paper are defiberized by means of an agitator attached to the pulper, etc. If said foreign matters receive the mechanical action of the agitator, etc. too much and are broken into too small pieces, this will affect the separation of the foreign matters in a subsequent fine screening process and flotation process.

In deciding the degree of defiberizing in said defiberizing process, an adjustment is made not to break foreign matters into too small pieces so as not to reduce fine screening and separation efficiencies in the subsequent processes. The degree of defiberizing may be adjusted by any means, for example, by changing the length of defiberizing time, pulp consistency, water temperature, the amount of added alkali, etc. when the equipment such as the pupler is determined.

Some of the papers forming said face stock or release liner are easy to defiberize or difficult to defiberize. Some of them are easily defiberized by means of water. Glassine Paper and special papers which are given water resistance and strength by resins, etc. may be easily defiberized by means of hot water or by adding alkali, etc. Thus, defiberizability differs according to the kinds of papers forming said face stock or release liner. Therefore, it is desirable to confirm the defiberizability of the broke by means of a preliminary experiment and perform a suitable defiberizing operation thereto.

According to the present invention, a suspension of waste paper obtained in said defiberizing process is diluted and the diluted solution is passed through a screen having a slit width of below 0.5 mm. (This process will hereinafter be referred to as "coarse screening process" and is represented by a reference numeral 23 in FIG. 2.) The foreign matters in the pressure-sensitive adhesive paper handled in the present invention are different in shape from the pulp fibers. While the pulp fibers are slender and have a diameter of below $40\mu$ and a length of below 7 mm, the foreign matters may retain a larger shape than the pulp fibers by adjusting the degree of defiberizing. Therefore, if a fine screening described below is made by utilizing the difference in shape, it is possible to obtain an excellent separation effect.

The screen used in the present invention is limited to a slit plate type screen because this has a separation effect much better than a screen of a round hole type according to experiments made by the inventors. The slit width of said screen should be below 0.5 mm. If the slit width is above 0.5 mm, foreign matters pass through the large slits. This means that the separation effect of the foreign matters is low and the burden of the subsequent flotation process becomes too large. If the slit width is below 0.5 mm, the separation effect of the foreign matters from the pulp is higher and the burden of the subsequent flotation process becomes small. Any screen of the slit plate type may be used as far as it has a slit width of below 0.5 mm.

The pulp suspension (accept) screened as mentioned above is adjusted in a dewatering and concentration process 24 so as to have a solid matter consistency of 15 to 40% by weight, preferably 15 to 30% by weight, more preferably 20 to 25% by weight, and then sent to kneading process 25. In the kneading process, a kneader gives said accept a high degree of shearing action under the temperature conditions mentioned below to treat the foreign matters, which are adhesives, in such a way that they are granulated rather than being dispersed. To achieve this object, it is necessary in the present invention that the difference between the temperature of the stuff before the kneading process and the temperature thereof after the kneading process is maintained below 12° C. If the pulp consistency in said kneading process is below 15%, it is impossible to give desired shearing action. If the pulp consistency in said kneading process is above 40%, excessive shearing action is given to the pulp and the foreign matters in the kneader.

The stuff obtained by said kneading is diluted in dilution process 26 so as to have a pulp consistency of below 5%, and then sent to a fine screening process 27 in which the foreign matters are separated from the pulp by means of a screen having a slit width of below 0.2 mm. The separation efficiency is very high because the foreign matters are granulated in said kneading process. Any screen of the slit plate type may be used as far as it has a slit width of below 0.2 mm. According to the state of the foreign matters, it is possible to perform screening a plurality of times in the fine screening process. In this case, subsequent screening is made preferably by means of a screen having all the functions of flotation separation, centrifugal separation and plate screen separation. For example, "Cube Screen" (made by SATOMI SEISAKUSHO CO., LTD.) has these three functions.

A surface active agent is added to the accept thus separated. Then the accept is brought into a flotation process 28 in which the accept is agitated while air is introduced thereinto. The Pulp consistency at the time of flotation may be about 0.1 to 1.5%. For the flotation in the present invention, a conventional flotator may be used as it is. No special device is necessary therefor.

The surface active agent used in the present invention may be a deinking agent normally used for deinking printed waste paper. When the surface active agent mainly comprises Fatty acid soap or an adduct of ethylene oxide/propylene oxide of soap of Fatty acids or oils, pressure-sensitive adhesives effectively adhere to the surface of foams and float with the foams, therefore the separation effect of the foreign matters is improved. The amount of addition of the surface active agent is adjusted according to the state of foaming and may be about 0.01 to 1.0% (of dry pulp).

In cleaning process 29, foreign matters are separated from the pulp by means of a cleaner for heavy foreign matters and/or a cleaner for light foreign matters. Cleaning is different from said screening, and separates foreign matters from pulp by utilizing the difference in specific gravity between them. In the cleaning process 29, light foreign matters (for example plastic films) existing in the stuff are removed by means of a cleaner for light foreign matters, and heavy foreign matters (for example sand, metal pieces and pigment) existing in the stuff are removed by means of a cleaner for heavy foreign matters.

The pulp liquid thus obtained is brought into the final washing process 30, in which it is dewatered and washed by a conventional method to remove bleaching agents, dyestuffs, fillers, etc. Now a finished pulp 31 is obtained.

In a case where the kneading Process is omitted and the coarse screening process and the fine screening process are performed, even if a surface active agent is added and flotation separation is made with the introduction of air, the separation efficiency of pressure-sensitive adhesives from pulp is not necessarily sufficient. Foreign matters which have passed the fine screening process contain foreign matters that are thin but have some surface area. These foreign matters cannot be sufficiently removed by flotation. These foreign matters cannot be completely removed even if the stuff is diluted and subjected to flotation after the kneading process. The inventors have earnestly studied about the cause thereof and have found the following. If pressure-sensitive adhesives remaining in pulp are granulated so that their particles become spheres in the kneading process, the relatively large particles of the pressure-sensitive adhesives do not easily come up with foams in the flotation process, therefore the separation efficiency of the pressure-sensitive adhesives from the pulp is reduced. The inventors have found that a desired effect is obtained by making the fine screening by means of a screen plate having a slit width of below 0.2 mm after the kneading process and then making the flotation. Thus the inventors have completed the invention. It has been found that foreign matters other than pressure-sensitive adhesives, such as plastic films, are mostly removed in the coarse screening process.

Now descriptions will be made of a case where waste pressure-sensitive adhesive paper handled in the present invention contains colored paper, a case where a special method is added to improve the separation efficiency of pressure-sensitive adhesives, which are foreign matters, from pulp fibers, and a case where glassine paper is used as the release liner of waste pressure-sensitive adhesive paper.

First, description will be made of said case where the waste paper contains colored paper. In this case, it is desirable to add a bleaching agent immediately before said kneading process. If no bleaching agent is added, the recycled pulp is still colored. If such colored pulp is used as it is, the Paper obtained from the colored pulp is affected thereby, the brightness of the paper and the commercial value thereof being reduced. Therefore, in the case where the waste paper contains colored paper, bleaching is very important.

Usable bleaching agents include oxidizing agents such as sodium hypochlorite, calcium hypochlorite, hydrogen peroxide and sodium peroxide as well as reducing agents such as hydrosulfite and Formamidine sulfinic acid. Particularly, said sodium hypochlorite and calcium hypochlorite are preferably used because they bleach dyestuffs well.

The amount of addition of the beaching agents is adjusted according to the kinds and amounts of dyestuffs contained in the paper. After addition, the bleaching agent must be sufficiently agitated so that it is uniformly dispersed in the pulp suspension. While a chemical mixer is normally used therefor, in the present invention, a bleaching agent is added immediately before the kneading process and is uniformly dispersed by agitation by means of the kneader.

The recycled pulp thus obtained has a high brightness and is free from troubles in the paper-making process and does not form spots on the paper. The paper obtained therefrom has excellent formation. The recycled pulp obtained in the present invention is industrially very useful.

Better effects are obtained if an inorganic pigment is added in the process of obtaining the recycled pulp of the present invention. This point will be described in detail below.

An inorganic pigment is added to waste paper stuff in an amount of above 1% by weight thereof in a process in which the waste paper receives mechanical action for the first time, that is, in the defiberizing process 22 in FIG. 2, during the pulping process for obtaining a recycled pulp from waste pressure-sensitive adhesive paper. In this case, even when the pressure-sensitive adhesive has a large adhesive strength, the adhesive is removed from pulp fibers relatively easily and, as a result, there will almost be no troubles of process contamination in the paper-making process.

According to the results of the inventors' study, to achieve better effects, it is desirable to add an inorganic pigment in an amount of above 3% by weight of the solid matter of waste paper in the process of giving mechanical action to the waste paper. It is not definitely clear why such effects are achieved, but it is considered that the effects are obtained because of the following: The pressure-sensitive adhesive is changed into a large number of small particles by the mechanical action and the surfaces of said particles are covered by the inorganic pigment, as a result, the adhesive is prevented from directly adhering to the inner surfaces of processing devices, tanks, pipes, etc.

Processes giving mechanical action to the waste paper in which an inorganic pigment is added include the defiberizing process, kneading process, high-speed defiberizer process (defiberizing process after kneading), etc. The inorganic pigment may be added only in the initial defiberizing process, but it is preferable to add the inorganic pigment not only in the initial defiberizing process but also in the subsequent kneading process and high-speed defiberizer process. Since in said subsequent processes the adhesive is changed into smaller particles and new surfaces of the adhesive appear, it is desirable to add the inorganic pigment also in said subsequent processes.

In the present invention, any inorganic pigment may be used. Usable inorganic pigments include, for example, calcium carbonate, magnesium carbonate, carbonate of calcium/magnesium, silicate, silicic acid, aluminium hydrate, barium sulfate, calcium sulfate, calcium sulfite, titanium dioxide, zinc pigment, et c. It is also possible to use two or more of these pigments together.

These inorganic pigments and adhesives are removed in the screening processes, cleaning process, flotation process and washing process. Thus, the pulping process of waste pressure-sensitive adhesive paper is free from adhesive contamination and a recycled pulp having an excellent quality is obtained.

A method of effectively pulping a kind of waste pressure-sensitive adhesive paper in which the release liner comprises glassine paper will now be described. In pulping the waste paper having a glassine release liner, it is desirable to add an acid matter in the defiberizing process in which the waste paper is defiberized (See reference numeral 32 in FIG. 2.). The acid matter is added preferably when the temperature of the waste paper in said defiberizing process is maintained above 30° C.

As is generally known, glassine paper used as a material for the release liner is very difficult to defiberize because the glassine paper is made of highly beaten pulp fibers and is finished by means of a super calender. Furthermore, a release agent such as a silicone compound and a fluorine compound applied to the glassine paper makes defiberizing in the pulping process much m o r e difficult. Therefore, at present, waste paper including pressure-sensitive adhesive paper using glassine paper is not pulped and is discarded.

To accelerate the defiberizing of waste pressure-sensitive adhesive paper having a glassine release liner, there can be a means of adding an alkaline agent or making the defiberizing time longer. Such a means can accelerate the defiberizing of the paper material, but at the same time plastic and pressure-sensitive adhesive are improperly broken into small pieces which are very difficult to remove in the subsequent separation process. Particularly when the defiberizing time is made longer, the defiberizing of the paper material is accelerated but, at the same time, plastic and pressure-sensitive adhesives are broken into fine pieces to an extent that they are not easily removed in the subsequent process and they hinder separation in the subsequent screening processes.

Plastic is not broken into small pieces by an alkaline agent. Plastic is broken into small pieces when the defiberizing time is made longer. Adhesives are softened by alkali so as to be easily broken into small pieces in the defiberizing process.

The present invention solves the above-mentioned problem by adding an acid matter in the process of defiberizing waste pressure-sensitive adhesive paper having a glassine release liner which is not easily defiberized so that the defiberizing of the paper material is accelerated and, at the same time, pressure-sensitive adhesive, etc. is not improperly made into small pieces. When the acid matter is added in the defiberizing process as mentioned above, the defiberizing of the paper material is accelerated greatly and, at the same time, plastics pressure-sensitive adhesive, etc. are prevented from being made into small pieces.

Any acid matter can be used in the present invention. Usable acid matters include, for example, hydrochloric acid, sulfuric acid, nitric acid, acetic acid, formic acid, alum, sodium bisulfate, sodium bisulfite, as well as waste sulfuric acid, acid salt cake, etc. which come out from Production facilities of chlorine dioxide.

The amount of addition of the acid matter is adjusted according to the kind of the acid matter and the content of the pressure-sensitive adhesive paper having a glassine release liner. The acid matter is added in an amount equal to 0.3 to 15% by weight, preferably 1 to 10% by weight, of the total waste paper. To accelerate defiberizing, the temperature at the time of defiberizing should be above 30° C. Defiberizing is accelerated as the temperature is higher. If the temperature is above 100° C., however, the pressure container is very expensive and this is not economical. The temperature should be below 100° C.

The pulp suspension obtained by the addition of the acid matter and defiberizing is subjected to said coarse screening Process, kneading process, fine screening process, then to said flotation process, and washing process, and if necessary to the bleaching process, etc. in order to obtain a recycled pulp. In these processes, plastic, etc. is effectively removed. The recycled pulp thus obtained has a high recovery rate of pulp and is industrially very useful.

FIG. 1 (a) to (c) are enlarged sectional views respectively showing the construction of a pressure-sensitive adhesive paper. Each pressure-sensitive adhesive paper comprises a face stock X and a release liner Y. The main component of these materials is paper. FIG. 1 (a) shows a polyethylene laminated type in which one surface of the release liner is partially laminated with a polyethylene film. FIG. 1 (b) shows a glassine type in which the release liner comprises glassine paper. FIG. 1 (c) shows a clay coated type in which the release liner is coated on two surfaces with clay. FIG. 2 is a flow chart giving the outline of the processes for obtaining a recycled pulp according to the present invention.

The present invention will now be described in detail with reference to examples and comparative examples. It is to be noted that the present invention is not limited to these examples. In the examples and comparative examples, "%" means "% by weight".

Example 1

A pressure-sensitive adhesive paper was used as waste paper stock, said pressure-sensitive adhesive paper comprising a face stock of a cast coated paper, a release liner of a cream-colored wood free paper laminated with a polyethylene film, said wood free paper being coated with a silicone resin as a release agent, the surface of said release liner being coated with an acrylic emulsion as a pressure-sensitive adhesive.

The above-mentioned waste paper, water and 5% (of waste paper) talc were put into a high-density pulper ("High-Density pulper" made by AIKAWA IRON WORKS CO., LTD.) so that the solid matter consistency was 15%, and defiberized for 20 minutes. The temperature of defiberizing at this time was 30° C.

The defiberized stuff was diluted so as to have a solid matter consistency of 3% and then passed through a coarse screen ("Fine Screen" made by AIKAWA IRON WORKS CO., LTD.) equipped with a screen basket having a slit width of 0.4 mm. Thereafter, the accept was dewatered so as to have a solid matter consistency of 23%. (An inclined extractor+screw press made by AIKAWA IRON WORKS CO., LTD. was used.) This concentrated stuff was mixed with sodium hypochlorite in an amount of 5% of bone dry solid matter and talc in an amount of 3% of bone dry solid matter, and this was kneaded by means of a disperser made by AIKAWA IRON WORKS CO., LTD. The difference between the temperature of the stuff before kneading and the temperature thereof after the kneading was 100° C. The stuff was heated to 550° C. by means of steam and left alone for 120 minutes. The stuff was diluted again so as to have a solid matter consistency of 3%. At the time of dilution, talc was added in an amount of 2% of bone dry solid matter.

The diluted stuff was passed through a fine screen ("Fine Screen" made by AIKAWA IRON WORKS CO., LTD.) equipped with a screen basket having a slit width of 0.15 mm.

The accept was mixed with 0.4% (of bone dry solid matter) surface active agent ("DI-610" made by Kao Corporation) comprising additives of fatty acid ethylene oxide/propylene oxide and subjected to flotation separation by means of a flotator ("Vertical Flotator" made by AIKAWA IRON WORKS CO., LTD.). The flotation separation was made two times.

This pulp was passed through a cleaner for heavy foreign matters ("Lamort low density cleaner" made by AIKAWA IRON WORKS CO., LTD.) and then a cleaner for light foreign matters ("Gyroclean" made by AIKAWA IRON WORKS CO., LTD.) . Thereafter this pulp was washed by means of a drum washer. Thus a recycled pulp was obtained.

No pressure-sensitive adhesive adhered to the interior of devices, pipes, etc. in any of said processes. The recycled pulp obtained had a brightness of 76%, no pressure-sensitive adhesive, residual film etc. found therein. A paper stuff prepared by using this recycled pulp was made into paper. The wires of the paper machine were not contaminated at all.

Example 2

A pressure-sensitive adhesive paper was used as waste paper stock, said pressure-sensitive adhesive paper comprising a face stock of a cast coated paper, a release liner of a light blue colored glassine paper coated with a silicone compound, said glassine paper being coated with an acrylic emulsion as a pressure-sensitive adhesive. This waste paper stock, water and 3% (of waste paper) talc were put into a pulper so that the pulp consistency was 18%, and defiberized for 20 minutes. The temperature of defiberizing at this time was 40° C.

The defiberized pulp suspension was diluted to 3% and then passed through a coarse screen (slit width of 0.2 mm) of the same type as used in Example 1. Thereafter, the accept pulp was dewatered so as to have a pulp consistency of 25%. The concentrated stuff was mixed with calcium hypochlorite in an amount of 4% of bone dry pulp and talc in an amount of 3%, and this was kneaded. The difference between the temperature of the stuff before kneading and the temperature thereof after the kneading was 8° C.

The kneaded stuff was let alone for 120 minutes at a temperature of 55° C. This pulp was diluted to 2% and bentonite in an amount of 2% (of bone dry solid matter) was added at the time of the dilution. The diluted pulp suspension was passed through a fine screen (slit width of 0.15 mm) of the same type as used in Example 1. This accept pulp was diluted to 0.8% and mixed with 0.4% (of bone dry pulp) surface active agent ("DI-610 R" made by Kao Corporation) comprising additives of fatty ethylene oxide/propylene oxide. Then the stuff was agitated while air was introduced thereinto, this flotation separation being made two times.

This pulp was passed through a cleaner for heavy foreign matters ("Lamort low density cleaner" made by AIKAWA IRON WORKS CO., LTD.). Thereafter this pulp was washed by means of a drum washer. Thus a recycled pulp was obtained.

The recycled pulp obtained had a brightness by Hunter of 80%, no pressure-sensitive adhesive, residual film etc. found therein. A paper stuff prepared by using this recycled pulp was made into paper. The wires of the paper machine were not contaminated at all.

Example 3

Pressure-sensitive adhesive papers comprising a first pressure-sensitive adhesive paper and a second pressure-sensitive adhesive paper in a ratio of 1:1 by weight were used as waste paper stock, said first pressure-sensitive adhesive paper comprising a face stock of a cast coated paper, a release liner of a glassine paper coated with a silicone compound (release agent), said glassine paper being coated with an acrylic emulsion as a pressure-sensitive adhesive, said second pressure-sensitive adhesive paper being the same as said first pressure-sensitive adhesive paper except that the face stock was an art paper and the release liner was a paper laminated with a polyethylene film.

The above-mentioned waste paper, water and 5% (of waste paper) kaolin were put into a pulper so that the pulp consistency was 15%, and defiberized for 20 minutes. The temperature of defiberizing at this time was 40° C.

The defiberized pulp suspension was diluted to 3% and then passed through a coarse screen (slit width of 0.35 mm) of the same type as used in Example 1. Thereafter, the accept pulp was dewatered so as to have a pulp consistency of 25%. The concentrated stuff was mixed with sodium hypochlorite in an amount of 4% of bone dry pulp and kaolin in an amount of 2%, and this was kneaded. The difference between the temperature of the stuff before kneading and the temperature thereof after the kneading was 10° C. The kneaded stuff was let alone for 120 minutes at a temperature of 55° C.

This pulp was diluted to 2% and talc in an amount of 2% (of bone dry solid matter) was added at the time of the dilution. The diluted pulp suspension was passed through a fine screen (slit width of 0.2 mm) of the same type as used in Example 1. This accept pulp was diluted to 0.8% and mixed with 0.4% (of bone dry pulp) surface active agent which was the same as used in Example 2. Then the stuff was agitated while air was introduced thereinto, this flotation separation being made once.

This pulp was passed through a cleaner for heavy foreign matters ("Lamort low density cleaner" made by AIKAWA IRON WORKS CO., LTD.) and then a cleaner for light foreign matters ("Gyroclean" made by AIKAWA IRON WORKS CO., LTD.). Thereafter this pulp was washed by means of a drum washer. Thus a recycled pulp was obtained.

The recycled pulp obtained had a brightness by Hunter of as high as 79%. The residual rate of pressure-sensitive adhesive was as low as 0.01% of the pulp. A paper stuff prepared by using this recycled pulp was made into paper. The wires of the paper machine were not contaminated at all.

Example 4

A pressure-sensitive adhesive paper was used as waste paper stock, said pressure-sensitive adhesive paper comprising a face stock of a cast coated paper, a release liner of a light blue colored glassine paper coated with a silicone compound, said glassine paper being coated with an acrylic emulsion as a pressure-sensitive adhesive. This waste paper stock, water and 3% (of waste paper) talc were put into a pulper so that the pulp consistency was 18%, and mixed with sulfuric acid so as to have a pH value of 5.0. Then the stuff was defiberized for 20 minutes. The temperature of defiberizing at this time was 40° C.

The defiberized pulp suspension was diluted to 3% and then passed through a coarse screen (slit width of 0.35 mm) of the same type as used in Example 1. Thereafter, the accept pulp was concentrated so as to have a pulp consistency of 25%. The concentrated stuff was mixed with sodium h y p o c h l o r i t e in an amount of 4% of bone dry pulp and bentonite in an amount of 2%, and this was kneaded. The difference between the temperature of the stuff before kneading and the temperature thereof after the kneading was 10° C. The kneaded stuff was left alone for 120 minutes at a temperature of 55° C.

This pulp was diluted to 2% and talc in an amount of 2% (of bone dry solid matter) was added at the time of the dilution. The diluted pulp suspension was passed through a fine screen (slit width of 0.2 mm) of the same type as used in Example 1. This accept pulp was diluted to 0.8% and mixed with 0.4% (of bone dry pulp) surface active agent which was the same as used in Example 2. Then the stuff was subjected to flotation separation by being agitated while air was introduced thereinto.

This pulp was passed through a cleaner for heavy foreign matters ("Lamort low density cleaner" made by AIKAWA IRON WORKS CO., LTD.). Thereafter this pulp was washed by means of a drum washer. Thus a recycled pulp was obtained.

The recycled pulp obtained had a brightness by Hunter of as high as 80%. The residual rate of pressure-sensitive adhesive was as low as 0.02% of the pulp. When paper was made by means of this pulp, the wires of the paper machine were not contaminated at all.

Example 5

A pressure-sensitive adhesive paper was used as waste paper stock, said pressure-sensitive adhesive paper comprising a face stock of a thermosensitive paper, a release liner of a cream-colored wood-free paper laminated with polyethylene and coated with a silicone compound, said cream-colored wood-free paper being coated with an acrylic emulsion as a pressure-sensitive adhesive. This waste paper stock, water, 4% (of waste paper) calcium carbonate and 2% sodium hydroxide were put into a pulper so that the pulp consistency was 15%, and defiberized for 20 minutes at a temperature of 30° C.

The defiberized pulp suspension was diluted to 2.5% and then passed through a coarse screen (slit width of 0.5 mm) of the same type as used in Example 1. Thereafter, the accept pulp was dewatered so as to have a pulp consistency of 20%. The concentrated stuff was mixed with sodium hypochlorite in an amount of 4% of bone dry pulp and calcium carbonate in an amount of 2%, and kneaded. The difference between the temperature of the stuff before kneading and the temperature thereof after the kneading was 6° C. The kneaded stuff was left alone for 120 minutes at a temperature of 55° C.

This pulp was diluted to 2%. The diluted pulp suspension was passed through a fine screen (slit width of 0.15 mm) of the same type as used in Example 1. This accept pulp was diluted to 0.8% and mixed with 0.4% (of bone dry pulp) surface active agent which was the same as used in Example 1. Then the stuff was agitated while air was introduced thereinto, this flotation separation being made two times.

This pulp was passed through a cleaner for heavy foreign matters ("Lamort low density cleaner" made by AIKAWA IRON WORKS CO., LTD.) and then a cleaner for light foreign matters ("Gyroclean" made by AIKAWA IRON WORKS CO., LTD.) Thereafter, this pulp was washed by means of a drum washer. Thus a recycled pulp was obtained.

The recycled pulp obtained had a brightness by Hunter of 75%, no pressure-sensitive adhesive, residual film etc. being found therein. Paper containing this pulp had excellent formation. No troubles such as process contamination occurred in paper making.

Example 6

A pressure-sensitive adhesive paper was used as waste paper stock, said pressure-sensitive adhesive paper comprising a face stock and a release liner both of a coated paper, a hot-melt pressure-sensitive adhesive being used, a silicone compound being applied as a release agent.

This waste paper stock, water, 5% (of waste paper) bentonite and 2% sodium hydroxide were put into a pulper so that the pulp consistency was 5%, and defiberized for 20 minutes. The temperature of defiberizing at this time was 30° C.

The defiberized pulp suspension was diluted to 2.5% and then passed through a coarse screen (slit width of 0.5 mm) of the same type as used in Example 1. Thereafter, the accept pulp was dewatered so as to have a pulp consistency of 29%. The concentrated stuff was mixed with sodium hypochlorite in an amount of 4% of bone dry pulp and talc in an amount of 2%, and kneaded. The difference between the temperature of the stuff before kneading and the temperature thereof after the kneading was 80° C. The kneaded stuff was left alone for 120 minutes at a temperature of 55° C.

This pulp was diluted to 2%. The diluted pulp suspension was passed through a fine screen (slit width of 0.2 mm) of the same type as used in Example 1. This accept pulp was diluted to 0.8% and mixed with 0.4% (of bone dry pulp) surface active agent, which was the same as used in Example 2. Then the stuff was agitated while air was introduced thereinto, this flotation separation being made two times.

This pulp was passed through a cleaner for heavy foreign matters ("Lamort low density cleaner" made by AIKAWA IRON WORKS CO. LTD.). Thereafter, this pulp was washed by means of a drum washer. Thus, a recycled pulp was obtained.

The recycled pulp obtained had a brightness by Hunter of 81%. The residual rate of pressure-sensitive adhesive was as low as 0.02%. No residual film was found. Paper containing this pulp had excellent formation. No troubles such as process contamination occurred in paper making.

Example 7

A pressure-sensitive adhesive paper used in Example 1 and water were put into a pulper so that the pulp consistency was 9% and defiberized for 20 minutes at a temperature of 30° C. Talc in an amount of 5% was added at the time of the defiberizing.

The defiberized pulp suspension was diluted to 3% and then passed through a coarse screen (slit width of 0.4 mm) of the same type as used in Example 1. Thereafter, the accept pulp was dewatered so as to have a pulp consistency of 23%. The concentrated stuff was mixed with sodium hypochlorite in an amount of 5% of bone dry pulp and talc in an amount of 3%, and kneaded. The difference between the temperature of the stuff before kneading and the temperature thereof after the kneading was 2° C. The kneaded stuff was left alone for 120 minutes at a temperature of 55° C.

This pulp was diluted to 3% and talc in an amount of 2% (of bone dry pulp) was added thereto. The diluted pulp suspension was passed through a fine screen (slit width of 0.15 mm) of the same type as used in Example 1. This accept pulp was diluted to 0.8% and mixed with 0.4% (of bone dry pulp) surface active agent which was the same as used in Example 1. Then the stuff was agitated while air was introduced thereinto, this flotation separation being made two times.

This pulp was passed through a cleaner for heavy foreign matters ("Lamort low density cleaner" made by AIKAWA IRON WORKS CO., LTD.) and then a cleaner for light foreign matters ("Gyroclean" made by AIKAWA IRON WORKS CO., LTD.). Thereafter, this pulp was washed by means of a drum washer. Thus, a recycled pulp was obtained.

The recycled pulp obtained had a brightness by Hunter of 76%. The residual rate of pressure-sensitive adhesive was 0.03% of the pulp. No residual film, etc. was found.

Example 8

Pressure-sensitive adhesive papers comprising a first pressure-sensitive adhesive paper and a second pressure-sensitive adhesive paper in a ratio of 1:2 by weight were used as waste paper stock, said first pressure-sensitive adhesive paper comprising a face stock of a wood free paper and a release liner of a glassine paper, said second pressure-sensitive adhesive paper comprising a face stock of a wood free paper and a release liner of a polyethylene laminated paper. In these pressure-sensitive adhesive papers, a silicone compound was used as a release agent and an acrylic emulsion was used as a pressure-sensitive adhesive.

The above-mentioned waste paper and water were put into a pulper so that the pulp consistency was 17%. This was mixed with waste art paper in an amount of 15% and further with aluminium sulfate so that the value of pH at the time of defiberizing was 5.5. The stuff was defiberized for 25 minutes at a temperature of 35° C.

The defiberized pulp suspension was diluted to 3% and then passed through a coarse screen (slit width of 0.3 mm) of the same type as used in Example 1. Thereafter, the accept pulp was dewatered so as to have a pulp consistency of 28%. The concentrated stuff was mixed with calcium hypochlorite in an amount of 4% of bone dry pulp and talc in an amount of 3%, and kneaded. The difference between the temperature of the stuff before kneading and the temperature thereof after the kneading was 10° C. The kneaded stuff was left alone for 120 minutes at a temperature of 55° C.

This pulp was diluted to 2% and talc in an amount of 2% (of bone dry pulp) was added thereto. The diluted pulp suspension was passed through a fine screen (slit width of 0.2 mm) of the same type as used in Example 1. This accept pulp was diluted to 0.8% and mixed with 0.4% (of bone dry pulp) fatty acid surface active agent ("DI-260" made by Kao Corporation) and with 0.1% (of bone dry pulp) anionic surface active agent ("DI-380" made by Kao Corporation). Then the stuff was agitated while air was introduced thereinto, this flotation separation being made two times.

This pulp was passed through a cleaner for heavy foreign matters ("Lamort low density cleaner" made by AIKAWA IRON WORKS CO., LTD.) and then a cleaner for light foreign matters ("Gyroclean" made by AIKAWA IRON WORKS CO., LTD.) Thereafter, this pulp was washed by means of a drum washer. Thus, a recycled pulp was obtained.

The recycled pulp obtained had a brightness by Hunter of 78%. The residual rate of pressure-sensitive adhesive was 0.01% of the pulp. No residual film, etc. was found.

Example 9

A pressure-sensitive adhesive paper used in Example 1 and water were put into a pulper so that the pulp consistency was 15%, and defiberized for 20 minutes at a temperature of 30° C. Talc in an amount of 5% was added at the time of the defiberizing.

The defiberized pulp suspension was diluted to 3% and then passed through a coarse screen (slit width of 0.4 mm) of the same type as used in Example 1. Thereafter, the accept pulp was dewatered so as to have a pulp consistency of 35%. The concentrated stuff was mixed with sodium hypochlorite in an amount of 5% of bone dry pulp and talc in an amount of 3%, and kneaded. The difference between the temperature of the stuff before kneading and the temperature thereof after the kneading was 10° C. The kneaded stuff was left alone for 120 minutes at a temperature of 55° C.

This pulp was diluted to 3% and talc in an amount of 2% (of bone dry pulp) was added thereto. The diluted pulp suspension was passed through a fine screen (slit width of 0.15 mm) of the same type as used in Example 1. This accept pulp was diluted to 0.8% and mixed with 0.4% (of bone dry pulp) surface active agent which was the same as used in Example 1. Then the stuff was agitated while air was introduced thereinto, this flotation separation being made two times.

This pulp was passed through a cleaner for heavy foreign matters ("Lamort low density cleaner" made by AIKAWA IRON WORKS CO., LTD.) and then a cleaner for light foreign matters ("Gyroclean" made by AIKAWA IRON WORKS CO., LTD.). Thereafter this pulp was washed by means of a drum washer. Thus a recycled pulp was obtained.

The recycled pulp obtained had a brightness by Hunter of 76%. The residual rate of pressure-sensitive adhesive was as low as 0.05% of the pulp. No residual film, etc. was found.

Example 10

A pressure-sensitive adhesive paper used in Example 1 and water were put into a pulper so that the pulp consistency was 15%, and defiberized for 20 minutes at a temperature of 30° C.

The defiberized pulp suspension was diluted to 3% and then passed through a coarse screen (slit width of 0.5 mm) of the same type as used in Example 1. Thereafter, the accept pulp was dewatered so as to have a pulp consistency of 38%. The concentrated stuff was mixed with sodium hypochlorite in an amount of 5% of bone dry pulp, and kneaded. The difference between the temperature of the stuff before kneading and the temperature thereof after the kneading was 8° C. The kneaded stuff was left alone for 120 minutes at a temperature of 55° C.

This pulp was diluted to 3%. The diluted pulp suspension was passed through a fine screen (slit width of 0.2 mm) of the same type as used in Example 1. This accept pulp was diluted to 0.8% and mixed with 0.4% (of bone dry pulp) surface active agent which was the same as used in Example 1. Then the stuff was agitated while air was introduced thereinto, this flotation separation being made two times.

This pulp was passed through a cleaner for heavy foreign matters ("Lamort low density cleaner" made by AIKAWA IRON WORKS CO., LTD.) and then a cleaner for light foreign matters ("Gyroclean" made by AIKAWA IRON WORKS CO., LTD.) . Thereafter this pulp was washed by means of a drum washer. Thus a recycled pulp was obtained.

The recycled pulp obtained had a brightness by Hunter of 76%. The residual rate of pressure-sensitive adhesive was as low as 0.13% of the pulp. No residual film, etc. was found. Some process contamination was found in paper making, but there was no actual damage.

Comparative Example 1

A recycled pulp was obtained in the same way as in Example 1 except that the addition of talc at the time of defiberizing was omitted a pulp suspension after coarse screening being dewatered so as to have a pulp consistency of 28%, and the difference between the temperature of the stuff before kneading and the temperature thereof after the kneading being 20° C.

The pulp thus obtained had a brightness by Hunter of 76. However, the pulp was tinged with yellow. The residual rate of pressure-sensitive adhesive was as high as 0.53% of the pulp. The wires of the paper machine was contaminated.

Comparative Example 21

A recycled pulp was obtained in the same way including the waste paper stock and processes as in Example 1 except that the slit width of the fine screen was 0.3 mm.

The recycled pulp thus obtained had a brightness by Hunter of 76. The residual rate of pressure-sensitive adhesive was 1.6% of the pulp.

Comparative Example 3

A recycled pulp was obtained in the same way as in Example 1 except that the pulp consistency at the time of defiberizing was 11%, the pulp consistency at the time of kneading was 25%, the difference between the temperature of the stuff before kneading and the temperature thereof after the kneading was 15° C., and the slit width of the fine screen was 0.2 mm.

The recycled pulp thus obtained had a brightness by Hunter of 76. The residual rate of pressure-sensitive adhesive was as high as 3.5% of the pulp.

Comparative Example 4

A recycled pulp was obtained in the same way as in Example 1 except that the difference between the temperature of the stuff before kneading and the temperature thereof after the kneading was 15° C., the slit width of the fine screen 0.2 mm and the cleaning process was omitted. A recycled pulp thus obtained had a brightness by Hunter of 76%. The residual rate of pressure-sensitive adhesive was as high as 4.5% of the pulp. Also some film pieces were found sporadically.

Comparative Example 5

A recycled pulp was obtained in the same way as in Example 1 except that the flotation process was omitted, the slit width of the fine screen was 0.2 mm, and the difference between the temperature of the stuff before kneading and the temperature thereof after the kneading was 15° C. The recycled pulp thus obtained had a brightness by Hunter of 76%. The residual rate of pressure-sensitive adhesive was as high as 5% of the pulp. Also some film pieces were found.

Comparative Example 6

A recycled pulp was obtained in the same way as in said Example 4 except that the addition of the acid matter at the time of defiberizing was omitted and fine screening was made at the time of flotation separation. The recycled pulp thus obtained had a brightness by Hunter of 80%. The residual rate of pressure-sensitive adhesive was 2% of the pulp which was relatively high. No film pieces were found.

Comparative Example 7

A recycled pulp was obtained in the same way as in said Example 3 except that the addition of kaolin at the time of defiberizing was omitted, the slit width of the coarse screen was 0.6 mm, the solid matter consistency after hydration was 13%, the addition of bleaching agent was omitted, the difference between the temperature of the stuff before kneading and the temperature thereof after the kneading was 5° C. the addition of talc at the time of the second dilution and fine screening was omitted, and only the cleaner for heavy foreign matters was used for cleaning. The recycled pulp thus obtained had a brightness by Hunter of 73%. The residual rate of pressure-sensitive adhesive was as high as 3.5% of the pulp. Many film pieces were found. Also some process contamination was found in paper making.

Comparative Example 8

A recycled pulp was obtained in the same way as in Example 3 except for the following: The addition of kaolin at the time of defiberizing was omitted. The slit width of the coarse screen was 0.6 mm. After the accept pulp was diluted so as to have a solid matter consistency of 2%, the accept pulp was subjected to fine screening by means of a screen having a slit width of 0.2 mm. Thereafter, the accept pulp was dewatered to 25% and mixed with bleaching agents consisting of sodium hypochlorite in an amount of 4% of bone dry pulp and kaolin in an amount of 2% of bone dry pulp. Then the stuff was kneaded. The difference between the temperature of the stuff before kneading and the temperature thereof after the kneading was 5° C. The addition of talc at the time of the second dilution and defiberizing was omitted. The flotation separation was made two times. The recycled pulp thus obtained had a brightness by Hunter of 78%. The residual rate of pressure-sensitive adhesive was 0.5% of the pulp which was relatively low. However, process contamination was found in paper making.

The above-mentioned examples and comparative examples are summarized in Tables 1 to 5. These tables also show the properties of a recycled pulp obtained in each of the examples and comparative examples, the existence of foreign matters in the pulp and the state of paper making by means of the pulp.

TABLE 1

|  | Example 1 | Example 2 | Example 3 | Example 4 |
|---|---|---|---|---|
| Waste paper (*1) | | | | |
| Face stock | cast coated paper | cast coated paper | cast coated paper art paper | cast coated paper |
| Adhesive | acrylic | acrylic | acrylic | acrylic |
| Release liner | polyethylene laminated paper (cream) | glassine paper (light blue) | glassine/polyethylene laminated (1:1) | glassine paper (light blue) |
| Pulping processes | | | | |
| Defiberizing | solid matter consistency 15% talc 5% 30° C., 20 min. | solid matter consistency 18% talc 3% 40° C., 20 min. | solid matter consistency 15% kaolin 5% 40° C., 20 min. | solid matter consistency 18% talc 3% 40° C., 20 min. pH 5.0 sulfuric acid added |
| Dilution | solid matter consistency 3% | solid matter consistency 3% | solid matter consistency 3% | solid matter consistency 3% |
| Coarse screening | 0.4 mm | 0.2 mm | 0.35 mm | 0.35 mm |
| Dewatering | solid matter consistency 23% | solid matter consistency 25% | solid matter consistency 25% | solid matter consistency 25% |
| Bleaching | NaClO 5% talc 3% | Ca(ClO)2 4% talc 3% | NaClO 4% kaolin 2% | NaClO 4% bentonite 2% |
| Mechanical agitation | kneading | kneading | kneading | kneading |
| Temperature difference of stuff | 10° C. | 8° C. | 10° C. | 10° C. |
| Dilution | solid matter consistency 3% talc 2% | solid matter consistency 2% bentonite 2% | solid matter consistency 2% talc 2% | solid matter consistency 2% talc 2% |
| Fine screening | 0.15 mm | 0.15 mm | 0.2 mm | 0.2 mm |
| Surface active agent | DI-610 0.4% | DI-600R 0.4% | DI-600R 0.4% | DI-600R 0.4% |
| Flotation | two steps | two steps | one step | one step |
| Cleaner | for heavy/ for light | for heavy/— | for heavy/ for light | for heavy/— |
| Washing | (*2) | | | |
| Pulp qualities | | | | |
| Pulp brightness | 76% | 80% | 79% | 80% |
| Residual adhesive (% of pulp) | 0% | 0% | 0.01% | 0.02% |
| Film pieces (No. in 1 kg pulp) | 0 | 0 | 0 | 0 |
| Process contamination | none | none | none | none |

TABLE 2

|  | Example 5 | Example 6 | Example 7 | Example 8 |
|---|---|---|---|---|
| Waste paper (*1) | | | | |
| Face stock | thermosensitive paper | coated paper | cast coated paper | wood free paper |
| Adhesive | acrylic | hot melt | acrylic | acrylic |
| Release liner | polyethylene laminated paper (cream) | coated paper | polyethylene laminated paper (cream) | glassine/polyethylene laminated (1:2) |
| Pulping processes | | | | |
| Defiberizing | solid matter consistency 15% | solid matter consistency 5% | solid matter consistency 9% | solid matter consistency 17% |

TABLE 2-continued

|  | Example 5 | Example 6 | Example 7 | Example 8 |
|---|---|---|---|---|
|  | Ca carbonate 4% (*3) | bentonite 5% | talc 5% | waste art paper 15% 35° C., 25 min. pH 5.5 alum added |
|  | 30° C., 20 min. NaOH 2% | 30° C., 20 min. NaOH 2% | 30° C., 20 min. |  |
| Dilution | solid matter consistency 2.5% | solid matter consistency 2.5% | solid matter consistency 3% | solid matter consistency 3% |
| Coarse screening | 0.5 mm | 0.5 mm | 0.4 mm | 0.3 mm |
| Dewatering | solid matter consistency 20% | solid matter consistency 29% | solid matter consistency 23% | solid matter consistency 28% |
| Bleaching | NaClO 4% Ca carbonate 2% | NaClO 4% talc 2% | NaClO 5% talc 3% | Cl(ClO)2 4% talc 3% |
| Mechanical agitation | kneading | kneading | kneading | kneading |
| Temperature difference of stuff | 6° C. | 8° C. | 2° C. | 10° C. |
| Dilution | solid matter consistency 2% | solid matter consistency 2% talc 2% | solid matter consistency 3% talc 2% | solid matter consistency 2% talc 2% |
| Fine screening | 0.15 mm | 0.2 mm | 0.15 mm | 0.2 mm |
| Surface active agent | DI-610 0.4% | DI-600R 0.4% | DI-610 0.4% | DI-260 0.4% DI-380 0.1% |
| Flotation | two steps | two steps | two steps | two steps |
| Cleaner | for heavy/ for light | for heavy/— | for heavy/ for light | for heavy/ for light |
| Washing | (*2) |  |  |  |
| Pulp qualities |  |  |  |  |
| Pulp brightness | 75% | 81% | 76% | 78% |
| Residual adhesive (% of pulp) | 0% | 0.02% | 0.03% | 0.01% |
| Film pieces (No. in 1 kg pulp) | 0 | 0 | 0 | 0 |
| Process contamination | none | none | none | none |

TABLE 3

|  | Example 9 | Example 10 |
|---|---|---|
| **Waste paper (*1)** |  |  |
| Face stock | cast coated paper | cast coated paper |
| Adhesive | acrylic | acrylic |
| Release liner | polyethylene laminated paper (cream) | polyethylene laminated paper (cream) |
| Pulping processes |  |  |
| Defiberizing | solid matter consistency 15% talc 5% 30° C., 20 min. | solid matter consistency 15% — 30° C., 20 min. |
| Dilution | solid matter consistency 3% | solid matter consistency 3% |
| Coarse screening | 0.4 mm | 0.5 mm |
| Dewatering | solid matter consistency 35% | solid matter consistency 28% |
| Bleaching | NaClO 5% talc 3% | NaClO 5% |
| Mechanical agitation | kneading | kneading |
| Temperature difference of stuff | 10° C. | 8° C. |
| Dilution | solid matter consistency 3% talc 2% | solid matter consistency 3% |
| Fine screening | 0.15 mm | 0.20 mm |
| Surface active agent | DI-610 0.4% | DI-610 0.4% |
| Flotation | two steps | two steps |
| Cleaner | for heavy/ for light | for heavy/ for light |
| Washing | (*2) |  |
| Pulp qualities |  |  |
| Pulp brightness | 76% | 76% |
| Residual adhesive (% of pulp) | 0.05% | 0.13% |
| Film pieces (No. in 1 kg pulp) | 0 | 0 |
| Process contamination | none | slight |

TABLE 4

|  | Comp. Example 1 | Comp. Example 2 | Comp. Example 3 | Comp. Example 4 |
|---|---|---|---|---|
| **Waste paper (*1)** |  |  |  |  |
| Face stock | cast coated paper | cast coated paper | cast coated paper | cast coated paper |
| Adhesive | acrylic | acrylic | acrylic | acrylic |
| Release liner | polyethylene laminated paper (cream) | polyethylene laminated paper (cream) | polyethylene laminated paper (cream) | polyethylene laminated paper (cream) |
| Pulping processes |  |  |  |  |
| Defiberizing | solid matter consistency 15% — 30° C., 20 min. | solid matter consistency 15% talc 5% 30° C., 20 min. | solid matter consistency 11% kaolin 5% 30° C., 20 min. | solid matter consistency 15% talc 5% 30° C., 20 min. |
| Dilution | solid matter con- | solid matter con- | solid matter con- | solid matter con- |

TABLE 4-continued

|  | Comp. Example 1 | Comp. Example 2 | Comp. Example 3 | Comp. Example 4 |
|---|---|---|---|---|
| Coarse screening | sistency 3% 0.4 mm | sistency 3% 0.4 mm | sistency 3% 0.4 mm | sistency 3% 0.4 mm |
| Dewatering | solid matter consistency 28% | solid matter consistency 23% | solid matter consistency 25% | solid matter consistency 23% |
| Bleaching | NaClO 5% talc 3% | NaClO 5% talc 3% | NaClO 5% talc 3% | NaClO 5% talc 3% |
| Mechanical agitation | kneading | kneading | kneading | kneading |
| Temperature difference of stuff | 20° C. | 10° C. | 15° C. | 15° C. |
| Dilution | solid matter consistency 3% talc 2% | solid matter consistency 3% talc 2% | solid matter consistency 3% talc 2% | solid matter consistency 3% talc 2% |
| Fine screening | 0.15 mm | 0.30 mm | 0.20 mm | 0.20 mm |
| Surface active agent | DI-610 0.4% | DI-610 0.4% | DI-610 0.4% | DI-610 0.4% |
| Flotation | two steps | two steps | two steps | two steps |
| Cleaner | for heavy/ for light | for heavy/ for light | for heavy/ for light | — |
| Washing | (*2) |  |  |  |
| Pulp qualities |  |  |  |  |
| Pulp brightness | 76% | 76% | 76% | 76% |
| Residual adhesive (% of pulp) | 0.53% | 1.6% | 3.5% | 4.5% |
| Film pieces (No. in 1 kg pulp) | 0 | 0 | 0 | 0 |
| Process contamination | found | none | none | none |

TABLE 5

|  | Comp. Example 5 | Comp. Example 6 | Comp. Example 7 | Comp. Example 8 |
|---|---|---|---|---|
| Waste paper (*1) |  |  |  |  |
| Face stock | cast coated paper | cast coated paper | cast coated paper art paper | cast coated paper art paper |
| Adhesive | acrylic | acrylic | acrylic | acrylic |
| Release liner | polyethylene laminated paper (cream) | glassine paper (light blue) | glassine/polyethylene laminated (1:1) | glassine/polyethylene laminated (1:1) |
| Pulping processes |  |  |  |  |
| Defiberizing | solid matter consistency 15% talc 5% 30° C., 20 min. | solid matter consistency 18% talc 3% 40° C., 20 min. | solid matter consistency 15% 40° C., 20 min. | solid matter consistency 15% 40° C., 20 min. |
| Dilution | solid matter consistency 3% | solid matter consistency 3% | solid matter consistency 3% | solid matter consistency 3% |
| Coarse screening | 0.4 mm | 0.35 mm | 0.60 mm | 0.60 mm |
| Dewatering | solid matter consistency 23% | solid matter consistency 25% | solid matter consistency 13% | solid matter consistency 2% |
| Bleaching | NaClO 5% talc 3% | NaClO 4% bentonite 2% | kaolin 2% | NaClO 4% kaolin 2% |
| Mechanical agitation | kneading | kneading | kneading | kneading |
| Temperature difference of stuff | 15° C. | 10° C. | 5° C. | 5° C. |
| Dilution | solid matter consistency 3% talc 2% | solid matter consistency 2% talc 2% | solid matter consistency 2% | solid matter consistency 2% |
| Fine screening | 0.20 mm | 0.2 mm | 0.2 mm | 0.2 mm |
| Surface active agent | DI-610 0.4% | DI-600R 0.4% | DI-600R 0.4% | DI-600R 0.4% |
| Flotation | — | one step | one step | two steps |
| Cleaner | for heavy/ for light | for heavy/— | for heavy/— | for heavy/ for light |
| Washing | (*2) |  |  |  |
| Pulp qualities |  |  |  |  |
| Pulp brightness | 76% | 80% | 73% | 78% |
| Residual adhesive (% of pulp) | 5.0% | 2.0% | 3.5% | 0.5% |
| Film pieces (No. in 1 kg pulp) | 2 | 0 | 15 | 0 |

TABLE 5-continued

|  | Comp. Example 5 | Comp. Example 6 | Comp. Example 7 | Comp. Example 8 |
|---|---|---|---|---|
| Process contamination | none |  | found | found |

Notes to Tables 1 to 5:
(*1)"Waste paper" stands for waste pressure-sensitive adhesive paper.
(*2)"c" means that washing was made.
(*3)"Ca carbonate" stands for calcium carbonate.

As described above, the present invention makes it possible to obtain a recycled pulp from waste pressure-sensitive adhesive paper which has not been pulped. Paper made by means of the recycled pulp obtained thereby has excellent formation and is free from trouble at the time of paper making.

Industrial Applicability

As mentioned above, the present invention makes it possible to produce a recycled pulp from a material mainly comprising waste pressure-sensitive adhesive paper which has had to be discarded. Thus the present invention has a great industrial applicability in view of the protection of resources and the prevention of pollution of the global environment.

We claim:

1. A method of pulping waster pressure-sensitive adhesive paper comprising the steps of: defiberizing the waste pressure-sensitive adhesive paper; forming a suspension of the defiberized waste pressure-sensitive adhesive paper; diluting said defiberized suspension of waste pressure-sensitive adhesive paper; coarse screening the diluted suspension with a screen having a slit width of below 0.5 mm to form a first accept fraction; dewatering the first accept fraction so that the first accept fraction has a solid matter consistency of 15 to 40% by weight; kneading the dewatered accept fraction by mechanical agitation under conditions such that the temperature difference between the dewatered accept fraction before and after the mechanical agitation is below 12° C. and foreign matters contained therein are granulated; diluting the kneaded accept fraction so that it has a pulp consistency of below 5%; fine screening the diluted accept fraction with a screen having a slit width of below 0.2 mm to form a second accept fraction; mixing the second accept fraction with a surface active agent; subjecting the mixture of the second accept fraction and the surface active agent to foam flotation separation by air agitation to form a pulp; cleaning the pulp to remove heavy and light foreign matters therefrom; washing the pulp; and recovering the pulp as useable recycled fibers.

2. A method of pulping waste pressure-sensitive adhesive paper as claimed in claim 1, wherein said first accept fraction after coarse screening has a solid matter consistency of 15 to 30% by weight.

3. A method of pulping waste pressure-sensitive adhesive paper as claimed in claim 1, wherein said first accept fraction after coarse screening has a solid matter consistency of 20 to 25% by weight.

4. A method of pulping waste pressure-sensitive adhesive paper as claimed in claim 1, wherein said dewatered accept fraction is mixed with an inorganic pigment in an amount equal to 1 to 50% by weight of said dewatered accept fraction when said dewatered accept fraction is mechanically agitated.

5. A method of pulping waste pressure-sensitive adhesive paper as claimed in claim 1, wherein said surface active agent used in foam flotation separation mainly comprises Fatty acids soap or an adduct of ethylene oxide/propylene oxide of sorts of Fatty acids or oils.

6. A method of pulping waste pressure-sensitive adhesive paper as claimed in claim 2, wherein bleaching is made at the same time as the mechanical agitation.

7. A method of pulping waste pressure-sensitive adhesive paper as claimed in claim 2, wherein bleaching is made at the same time as the mechanical agitation.

8. A method of pulping waste pressure-sensitive adhesive paper as claimed in claim 3, wherein bleaching is made at the same time as the mechanical agitation.

9. A method of pulping waste pressure-sensitive adhesive paper as claimed in claim 4, wherein bleaching is made at the same time as the mechanical agitation.

10. A method of pulping waste pressure-sensitive adhesive paper as claimed in claim 5, wherein bleaching is made at the same time as the mechanical agitation.

11. A method of pulping waste pressure-sensitive adhesive paper as claimed in claim 6, wherein a bleaching agent used in said bleaching is sodium hypochlorite and/or calcium hypochlorite.

12. A method of pulping waste pressure-sensitive adhesive paper as claimed in claim 7, wherein a bleaching agent used in said bleaching is sodium hypochlorite and/or calcium hypochlorite.

13. A method of pulping waste pressure-sensitive adhesive paper as claimed in claim 8, wherein a bleaching agent is used in said bleaching is sodium hypochlorite and/or calcium hypochlorite.

14. A method of pulping waste pressure-sensitive adhesive paper as claimed in claim 9, wherein a bleaching agent used in said bleaching is sodium hypochlorite and/or calcium hypochlorite.

15. A method of pulping waste pressure-sensitive adhesive paper as claimed in claim 10, wherein a bleaching agent used in said bleaching is sodium hypochlorite and/or calcium hypochlorite.

16. A method of pulping waste pressure-sensitive adhesive paper as claimed in claim 1, wherein an acid matter is added to said waster pressure-sensitive adhesive paper in a process where said waste paper containing a release liner of glassine paper is defiberized.

17. A method of pulping waste pressure-sensitive adhesive paper as claimed in claim 2, wherein an acid matter is added to said waste pressure-sensitive adhesive paper in a process where said waste paper containing a release liner of glassine paper is defiberized.

18. A method of pulping waste pressure-sensitive adhesive paper as claimed in claim 3, wherein an acid matter is added to said waste pressure-sensitive adhesive paper in a process where said waste paper containing a release liner of glassine paper is defiberized.

19. A method of pulping waster pressure-sensitive adhesive paper as claimed in claim 4, wherein an acid matter is added to said waste pressure-sensitive adhesive paper in a process where said waste paper containing a release liner of glassine paper is defiberized.

20. A method of pulping waste pressure-sensitive adhesive paper as claimed in claim 5, wherein an acid matter is added to said waste pressure-sensitive adhesive paper in a process where said waste paper containing a release liner of glassine paper is defiberized.

* * * * *

UNITED STATES PATENT AND TRADEMARK OFFICE
CERTIFICATE OF CORRECTION

PATENT NO. : 5 316 621
DATED : May 31, 1994
INVENTOR(S) : Osamu KITAO et al It is certified that error appears in the above-identified patent and that said Letters Patent is hereby corrected as shown below:

Column 23, line 25; change "waster" to ---waste---.
Column 24, line 10, change "2" to ---1---.

Signed and Sealed this

Eighteenth Day of October, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,316,621
DATED : May 31, 1994
INVENTOR(S) : Osamu KITAO et al

It is certified that error appears in the above-identified patent and that said Letters Patent is hereby corrected as shown below:

Column 23, line 68; change "Fatty" to ---fatty---.
           line 69; change "Fatty" to ---fatty---.

Signed and Sealed this

Twenty-ninth Day of November, 1994

Attest:

BRUCE LEHMAN

Attesting Officer     Commissioner of Patents and Trademarks